United States Patent [19]
Lee

[11] Patent Number: 5,923,382
[45] Date of Patent: Jul. 13, 1999

[54] SUPERIMPOSING APPARATUS AND METHOD FOR DISPLAYING AN OVERLAPPING IMAGE WITHOUT LOSS OF AN ORIGINAL IMAGE

[75] Inventor: Chul-ho Lee, Seoul, Rep. of Korea

[73] Assignee: Samsung Electronics, Co., Ltd., Suwon, Rep. of Korea

[21] Appl. No.: 08/917,657

[22] Filed: Aug. 26, 1997

Related U.S. Application Data

[30] Foreign Application Priority Data

Aug. 27, 1996 [KR] Rep. of Korea ..................... 96/35889

[51] Int. Cl.⁶ ..................................................... H04N 9/76
[52] U.S. Cl. ........................... 348/599; 348/592; 348/274
[58] Field of Search ..................................... 348/589, 590, 348/596–600, 569, 570, 274, 276, 577, 584–586, 563, 564, 578, 593–597; H04N 9/76

[56] References Cited

U.S. PATENT DOCUMENTS

| | | | |
|---|---|---|---|
| 5,418,574 | 5/1995 | Miyabata et al. | 348/625 |
| 5,495,297 | 2/1996 | Fujimori et al. | 348/590 |
| 5,574,510 | 11/1996 | Abe | 348/584 |
| 5,598,224 | 1/1997 | Choi | 348/600 |
| 5,812,213 | 9/1998 | Moriwake | 348/578 |

*Primary Examiner*—Andrew I. Faile
*Assistant Examiner*—Reuben M. Brown
*Attorney, Agent, or Firm*—Marger Johnson & McCollom, P.C.

[57] ABSTRACT

An apparatus and method are shown for superimposing an overlapping image signal on an original image signal while preserving the original image. An embodiment of a method according to the present invention includes generating a color difference signal for a shape of the overlapping image responsive to a color difference signal of the original image and a signal which includes a gain coefficient for a magnitude of a color difference to be expressed in an edge of the overlapping image and generating a color difference signal for the edge of the overlapping image responsive to a signal which includes a magnitude and phase of the color difference of the edge of the overlapping image. The method then involves selecting one of the color difference signal of the original image, the color difference signal for the shape of the overlapping image, and the color difference signal for the edge of the overlapping image responsive to a signal which includes the shape and position of the overlapping image, wherein the color difference signal for the shape of the overlapping image is selected to coincide with positions inside of the position of the edge of the overlapping image, the color difference signal for the edge of the overlapping image is selected to coincide with the position of the edge of the overlapping image and the color difference signal of the original image is selected for display at positions that do not coincide with the position of the edge of the overlapping image and the positions inside the edge of the overlapping image.

11 Claims, 7 Drawing Sheets

SUPERIMPOSING APPARATUS AND METHOD FOR DISPLAYING AN OVERLAPPING IMAGE WITHOUT LOSS OF AN ORIGINAL IMAGE

BACKGROUND OF THE INVENTION

The present invention relates to a superimposing apparatus for displaying an original image signal overlapped with another image signal, and more particularly, to a superimposing apparatus for performing an image overlap or a letter mixture while maintaining the shape of the original image.

FIG. 1A is a block diagram showing a conventional superimposing apparatus for generating a color difference signal. In the drawing, a control signal SICSEL is for selecting a color signal to be used in an overlapping image or mixing title and a control signal SICBLK is for designating a position of the overlapping image or the mixing title within the image displayed on a screen.

The superimposing apparatus of the color difference signal includes an address decoder 1 for generating an address according to the control signal SICSEL, a first Read-Only-Memory (ROM) 2 for storing a plurality of Red-Yellow (R-Y) color difference signals and for outputting the R-Y color difference signal SIRY which corresponds to an input address, a second ROM 3 for storing a plurality of Blue-Yellow (B-Y) color difference signals and outputting the B-Y color difference signal SIBY which corresponds to the input address. The conventional superimposing apparatus of FIG. 1A also includes a first multiplexor (MUX) 4 for receiving a red-yellow chrominance signal CRY and the SIRY signal and for outputting one of the signals according to a position control signal SICBLK, a D flip-flop 5 for latching the output of the first MUX 4 according to a subclock SCK, a second MUX 6 for receiving a blue-yellow chrominance signal CBY and the SIBY signal and outputting one of the signals according to the position control signal SICBLK and a D flip-flop 7 for latching the output of the second MUX 6 according to the subclock SCK.

FIG. 1B is a block diagram showing a luminance signal superimposing apparatus according to a conventional technology. In the drawing, a control signal SIYSEL is for selecting the luminance signal to be used in the overlapping image or the mixing title, and a control signal SIYBLK is for designating the position of the overlapping image or the mixing title.

The luminance signal superimposing apparatus includes an address decoder 8 for generating an address according to the control signal SIYSEL, a third ROM 9 for storing a plurality of luminance signal levels and for outputting the luminance signal which corresponds to the input address, a delay unit 10 for delaying the luminance signal for a predetermined amount of time in order to synchronize the luminance signal and the color signal, a third MUX 11 for receiving the output of the delay unit 10 and the third ROM 9 and outputting one of them according to the position control signal SIYBLK, and a D flip-flop 12 for latching the output of the third MUX 11 according to a system clock PCK. Here, the frequency of the subclock SCK above is ½ that of a system clock PCK.

Generally, the conventional superimposing apparatus for overlapping a predetermined image or mixing the title with the original image in a recording device, such as a camcorder and a VCR, is constructed as shown in FIGS. 1A and 1B. In the conventional superimposing apparatus, the original image which exists in the overlapping position is lost by deleting the original image that coincides with the overlapping position on the screen when displaying the luminance signal and the color signal of the overlapping image which is read from the ROMs 2, 3 and 9 in the position from which the original image was deleted. This is also the case when performing a title mix. That is to say that, when performing either an image overlap or a title mix with an original image signal, when a predetermined overlapping image signal is displayed in an overlapping position on the screen then the original image in the overlapping position is lost.

SUMMARY OF THE INVENTION

It is an object of the present invention to provide a superimposing apparatus and method for maintaining an original image which exists in an overlapping position while superimposing an overlapping image or title mix.

An embodiment of a color difference signal superimposing apparatus for displaying an original image signal overlapped with another image signal, according to the present invention, includes edge color difference signal setting means for setting an edge color difference signal to be displayed as the edge of the overlapping image according to information regarding the magnitude and phase of a color difference signal of the edge of the overlapping image combined with a shape color difference signal setting means for changing the magnitude of the color difference signal of the original image according to a gain coefficient for setting the magnitude of the color difference signal to be expressed in the edge of the overlapping image and setting the shape color difference signal to be expressed in the edge of the overlapping image and a position signal generating means for generating a position signal which determines the position in which the color difference signal is to be displayed on a screen according to the information regarding the shape and the position of the overlapping image. A color difference signal selecting means of the apparatus selects for output one from among the color difference signal of the original image, the shape color difference signal, and the edge color difference signal according to the position signal, wherein the color difference signal superimposing apparatus outputs the shape color difference signal to the inside position of the edge of the overlapping image, the edge color difference signal to the position of the edge of the overlapping image, and the color difference signal of the original image to the position in which the original image is to be displayed.

An embodiment of a luminance signal superimposing apparatus for displaying an original image signal overlapped with another image signal, according to the present invention, includes an edge luminance signal setting means for setting an edge luminance signal to be displayed as the edge of the overlapping image according to the information regarding the magnitude of a luminance signal of the edge of the overlapping image, an overlap luminance signal setting means for changing the magnitude of the luminance signal of the original image according to a gain coefficient for setting the magnitude of the luminance signal expressing the overlapping image and setting an overlap luminance signal to be expressed in the edge of the overlapping image, and a position signal generating means for generating a position signal which determines the position in which the luminance signal is to be displayed on a screen according to the information concerning the shape and the position of the overlapping image. The luminance signal superimposing apparatus also includes a luminance signal selecting means for selecting and outputting one from among the luminance signal of the original image, the overlap luminance signal, and the edge luminance signal according to the position signal, wherein said luminance signal superimposing apparatus outputs the overlap luminance signal to the inside position of the edge of the overlapping image, the edge luminance signal to the position of the edge of the overlapping image, and the luminance signal of the original image is to be displayed.

An embodiment of a method for generating a color difference signal for an overlapping image while preserving an original image, according to the present invention includes generating a color difference signal for a shape of the overlapping image responsive to a color difference signal of the original image and a signal which includes a gain coefficient for a magnitude of a color difference to be expressed in an edge of the overlapping image and generating a color difference signal for the edge of the overlapping image responsive to a signal which includes a magnitude and phase of the color difference of the edge of the overlapping image. The method then involves selecting one of the color difference signal of the original image, the color difference signal for the shape of the overlapping image, and the color difference signal for the edge of the overlapping image responsive to a signal which includes the shape and position of the overlapping image, wherein the color difference signal for the shape of the overlapping image is selected to coincide with positions inside of the position of the edge of the overlapping image, the color difference signal for the edge of the overlapping image is selected to coincide with the position of the edge of the overlapping image and the color difference signal of the original image is selected for display at positions that do not coincide with the position of the edge of the overlapping image and the positions inside the edge of the overlapping image.

An embodiment of a method for generating a luminance signal for an overlapping image while preserving an original image, according to the present invention, includes generating a delayed luminance signal for the original image by delaying a luminance signal of the original image by a predetermined amount of delay required to synchronize the luminance signal of the original image and a color difference signal of the original image, generating a luminance signal for the overlapping image responsive to the delayed luminance signal for the original image and a signal which includes a gain coefficient for setting a magnitude of the luminance signal for the overlapping image, wherein a magnitude of the delayed luminance signal is changed according to the gain coefficient, and generating a luminance signal for an edge of the overlapping image responsive to a signal which includes a magnitude of the luminance signal for an edge of the overlapping image. The method then involves selecting one of the delayed luminance signal for the original image, the luminance signal for the overlapping image and the luminance signal for the edge of the overlapping image responsive to a signal which includes a shape and position of the overlapping image, wherein the luminance signal for the edge of the overlapping image is selected to coincide with a position of the edge of the overlapping image, the luminance signal for the overlapping image is selected to coincide with positions inside the position of the edge of the overlapping image, and the delayed luminance signal of the original image is selected to coincide with positions that do not coincide with the position of the edge of the overlapping image and the positions inside the position of the edge of the overlapping image.

BRIEF DESCRIPTION OF THE DRAWINGS

The above object and advantages of the present invention will become more apparent by describing in detail a preferred embodiments thereof with reference to the attached drawings in which.

DETAILED DESCRIPTION OF THE INVENTION

Hereinafter, the present invention will be described in detail with reference to the attached drawings.

Figure 1A:
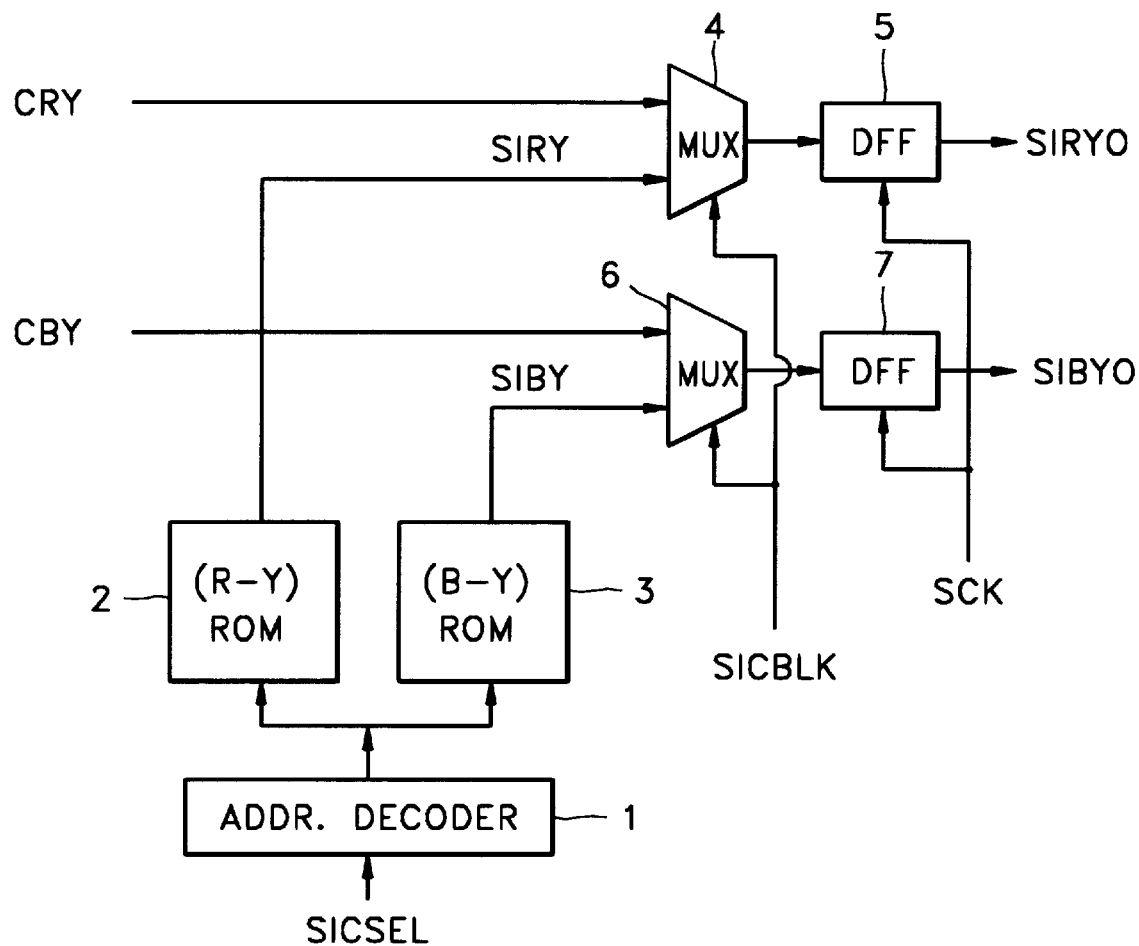
FIG. 1A is a block diagram showing the structure of a color signal superimposing apparatus according to a conventional technology.
Figure 1B:
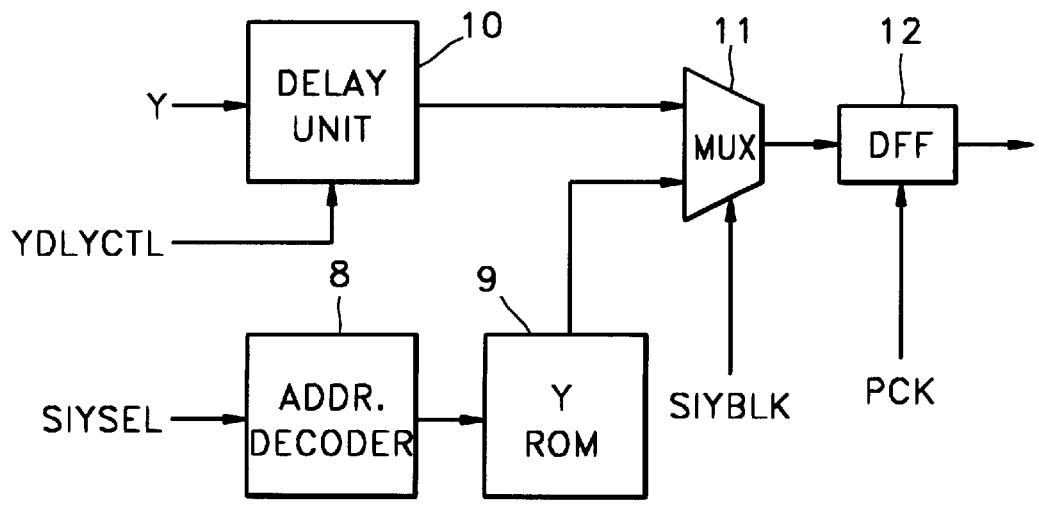
FIG. 1B is a block diagram showing the structure of a luminance signal superimposing apparatus according to a conventional technology.
Figure 2A:
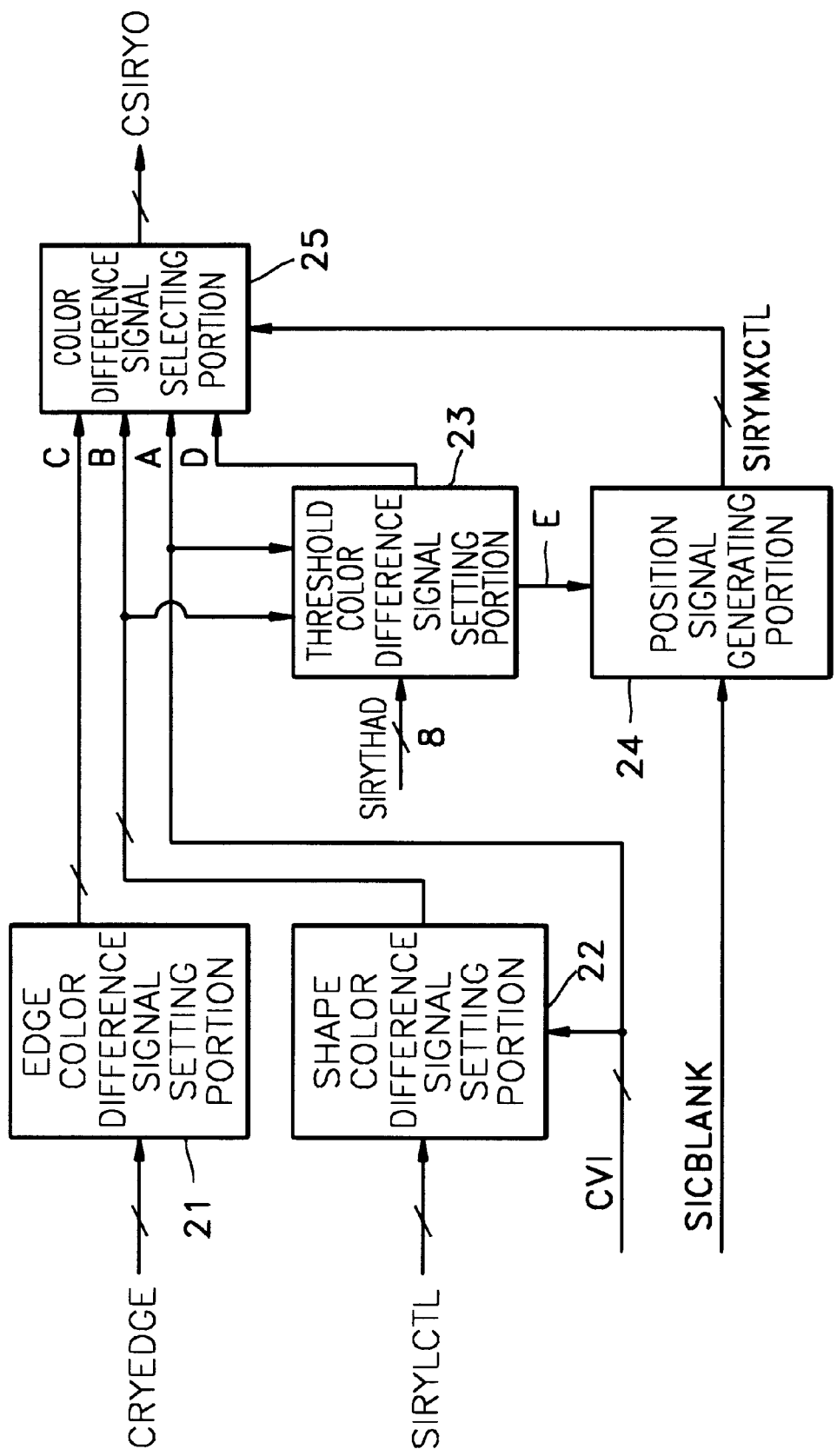
FIG. 2A is a block diagram of an R-Y color difference signal superimposing apparatus according to the present invention.

FIG. 2A is a block diagram showing the structure of a R-Y color difference signal superimposing apparatus according to the present invention. In the drawing, a red-yellow chrominance edge signal CRYEDGE includes information concerning the magnitude and phase of the R-Y color difference signal of the edge of an overlapping image. A SIRYLCTL signal includes information concerning a gain coefficient for setting the magnitude of the R-Y color difference signal to be expressed in the edge of the overlapping image. A CVI signal is the R-Y color signal of the original image. A SIRYTHAD signal includes information regarding a predetermined threshold value. A SICBLANK signal includes information regarding the shape and position of the overlapping image.

An edge color difference signal setting portion 21 sets an edge R-Y color difference signal C to be displayed as the edge of the overlapping image according to the CRYEDGE signal.

A shape color difference signal setting portion 22 receives the CVI signal, i.e., the R-Y color difference signal of the original image and SIRYLCTL signal, changes the magnitude of the CVI signal according to the gain coefficient specified by the SIRYLCTL signal, and sets the magnitude of a shape R-Y color difference signal B to be expressed in the edge of the overlapping image.

A threshold color difference setting portion 23 receives a SIRYTHAD signal and a CVI signal and generates a threshold R-Y color difference signal D which is set by adding a predetermined value to the CVI signal or subtracting a predetermined value from the CVI signal according to the SIRYTHAD signal. Also, the threshold color difference setting portion 23 receives the shape R-Y color difference signal B, compares the magnitude of the threshold R-Y color difference signal D with that of the shape R-Y color difference signal B, and generates the information E concerning the position of the overlapping image when the magnitude of the shape R-Y color difference signal B is larger than that of the threshold R-Y color difference signal D.

A position signal generating portion 24 performs a logic operation with respect to the SICBLANK signal and the control signal E and produces a position signal SIRYMX-CTL which determine the position of the color difference signal to be displayed on the screen.

A color difference signal selecting portion 25 outputs a selected color difference signal CSIRYO selected from among the color difference signals A of the original image, B of the shape of the overlapping image, C of the edge of the overlapping image, and the threshold color difference signal D according to the position signal SIRYMXCTL. Namely, the color difference signal selecting portion 25 outputs the B signal to the inside position of the edge of the overlapping image, the C signal to the position of the edge of the overlapping image, and the A signal to the position in which the original image is to be displayed. If the B signal is larger than the D signal, the D signal is output instead of the B signal in the position in which the B signal is to be output so as to prevent an unnatural color from appearing on the screen.

Also, the superimposing apparatus (not shown) for the B-Y color difference signal can be construed much like the apparatus shown in FIG. 2A.

Figure 2B:
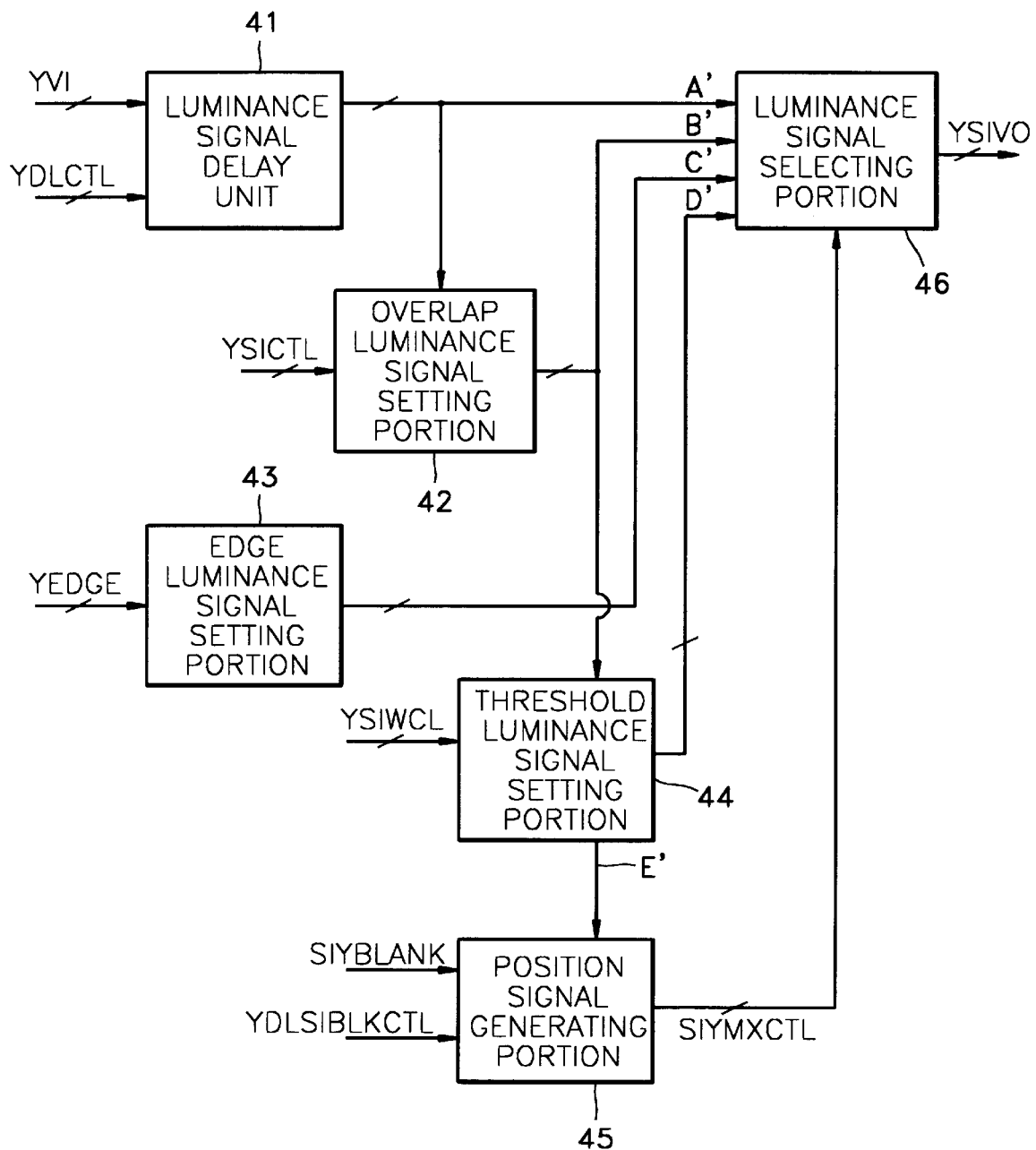
FIG. 2B is a block diagram of a luminance signal superimposing apparatus according to the present invention.

FIG. 2B is a block diagram of a luminance signal superimposing apparatus according to the present invention. In the drawing, a YVI signal is the luminance signal of the original image. A YDLCTL signal is for delaying the luminance signal for a predetermined amount of time in order to synchronize the luminance signal and the color difference signal. A YSICTL signal includes information concerning the gain coefficient for setting the magnitude of the luminance signal for expressing the overlapping image. A YEDGE signal includes information regarding the magnitude of the luminance signal for the edge of the overlapping image. A YSIWCL signal is a white clip level signal of the luminance signal. A SIYBLANK signal includes information regarding the shape and position of the overlapping image.

A luminance signal delay unit 41 delays the YVI signal for a predetermined amount of time according to the YDLCTL signal.

An overlap luminance signal setting portion 42 receives the delayed YVI signal, i.e. the luminance signal of the original image and YSICTL signal, changes the magnitude of the YVI signal according to the gain coefficient specified by the YSICTL signal, and sets the magnitude of the luminance signal B' of the overlapping image.

An edge luminance signal setting portion 43 sets the edge luminance signal C' to be displayed as the edge of the overlapping image according to the YEDGE signal.

A threshold luminance signal setting portion 44 receives the YSIWCL signal and the overlap luminance signal B', outputs the YSIWCL signal as the threshold luminance signal D', and generates the information E' concerning the position of the overlapping image when the overlap luminance signal B' is larger than the YSIWCL signal by comparing the magnitude of the overlap luminance signal B' with that of the YSIWCL signal.

A position signal generating portion 45 performs a logical operation with respect to the SIYBLANK signal and the control signal E' and produces the position signal SIYMX-CTL for determining the position of the luminance signal to be displayed on the screen.

A luminance signal selecting portion 46 outputs a selected luminance signal YSIVO selected from among the luminance signals A' of the original image, B' of the overlapping image, C' of the edge of the overlapping image, and the threshold luminance signal D' according to the position signal SIYMXCTL. Namely, the luminance signal selecting portion 46 outputs the B' signal to the inside position of the edge of the overlapping image, the C' signal to the edge position of the overlapping image, and the A' signal to the position in which the original image is to be displayed. If the magnitude of the B' signal is larger than that of the D' signal, the D' signal instead of the B' signal is output in the position in which the B' signal is to be displayed.

Figure 3A:
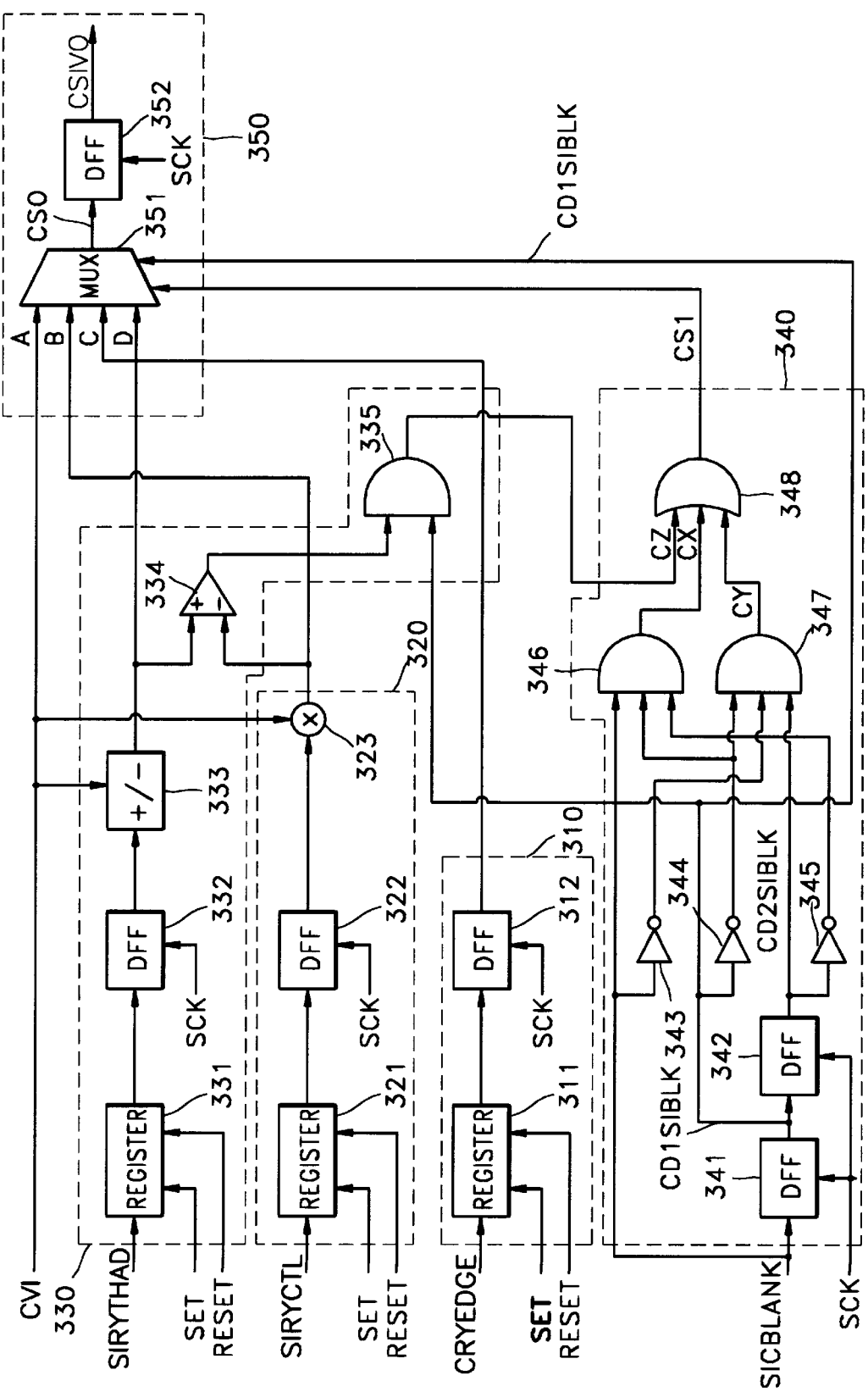
FIG. 3A is a diagram showing an embodiment of the color difference signal superimposing apparatus shown in FIG. 2A.
Figure 3B:
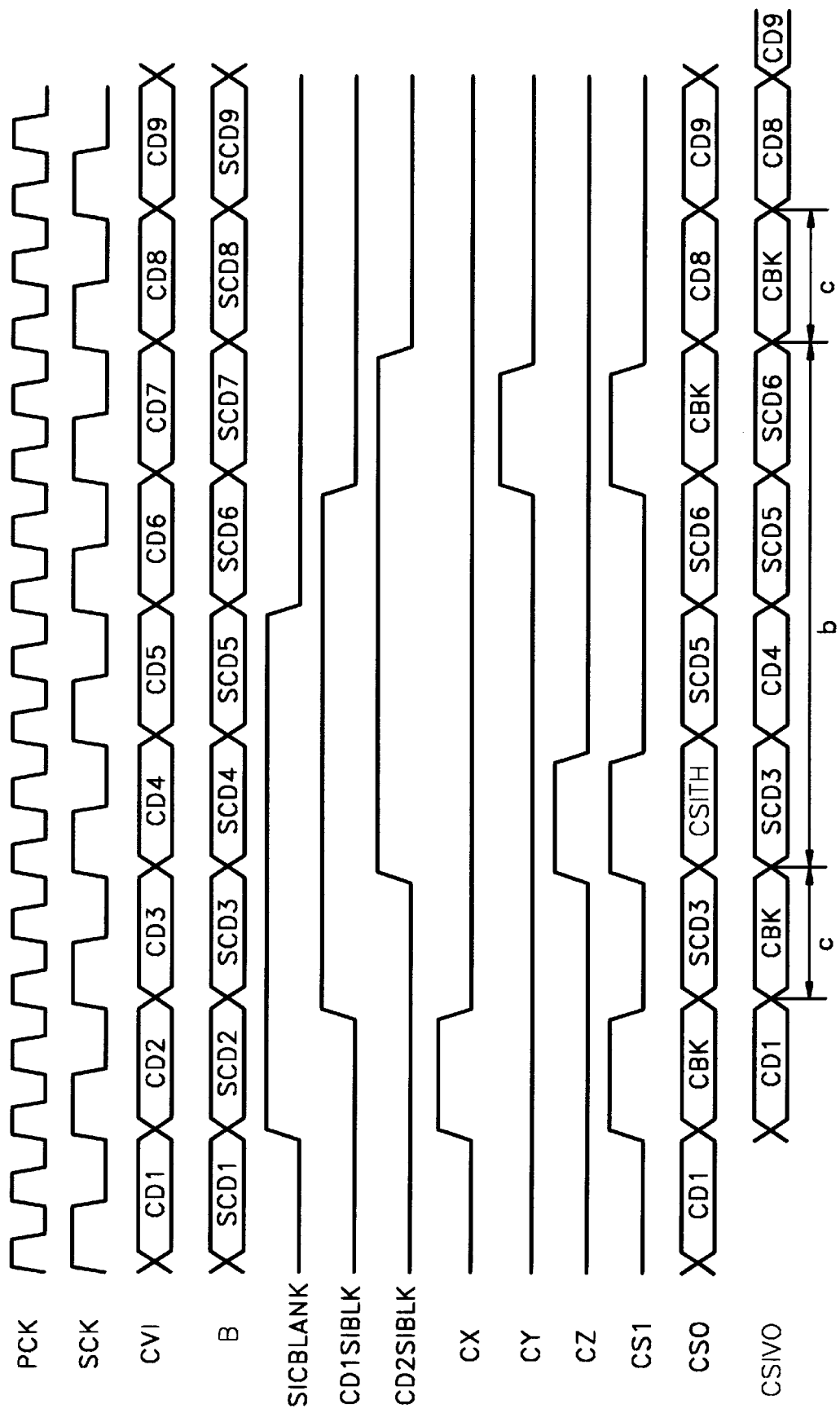
FIG. 3B is a timing diagram for explaining the operation of the apparatus shown in FIG. 3A.

FIG. 3A is a more detailed function block diagram of an embodiment of the color difference signal superimposing apparatus shown in FIG. 2A. FIG. 3B is a timing diagram illustrating the operation of the apparatus shown in FIG. 3A.

An edge color difference signal setting portion 310, which outputs an edge color difference signal C, includes a register 311 for receiving the CRYEDGE signal and a D flip-flop 312.

Shape color signal setting portion 320, which outputs a shape color difference signal B, includes a register 321, to which the SIRYCTL signal is input, a D flip-flop 322, and a multiplier 323 for multiplying the output of the D flip-flop 322 by the color difference signal CVI of the original image.

Threshold signal setting portion 330, which outputs an information signal CZ concerning the threshold color difference D and the position in which the D signal is to be output, includes a register 331 to which the SIRYTHAD signal is input, a D flip-flop 332, and a computing element 333 for outputting a threshold color difference signal D either by adding the output of the D flip-flop 332 to the color difference signal CVI of the original image or by subtracting the output of the D flip-flop 322 from the color difference signal CVI under control of a microcomputer (not shown). The threshold signal setting portion 330 also includes a comparator 334 for comparing the output D of the computing element 333 with the output B of the multiplier 323, and an AND gate 335 for performing a logical AND operation on the output signal of the comparator 334 and a delayed blanking signal CD1SIBLK.

Position signal generating portion 340, which outputs the CS1 and CD1SIBLK signal, includes D flip-flops 341 and 342, inverters 343, 344 and 345, AND gates 346 and 347 and an OR gate 348.

Color difference signal selecting portion 350 includes a MUX 351 for selecting one signal from among the signals A, B, C and D, which are selected according to the position signals CS1 and CD1SIBLK, and a D flip-flop 352 for latching the output of the MUX 351 according to the subclock signal SCK. The MUX 351 outputs the color difference signal CVI of the original image when the blanking signal SICBLANK is 'low' and outputs the color difference signal of the overlapping image when the blanking signal SICBLANK is 'high'.

Hereinafter, the operation of the apparatus when the blanking signal is 'high' will be described.

The color difference signal CRYEDGE of the edge is delayed by the register 311 and the D flip-flop 312, and the color and magnitude of the edge signal are determined, after which the edge signal is output to the MUX 351. The gain SIRYCTL and the color difference signal CVI of the original image are multiplied in the multiplier 323 and the resultant value is output to the MUX 351, while a standard value SIRYTHAD of the color difference signal is delayed in the register 331 and the D flip-flop 332. The threshold color difference signal D is produced by subtracting the standard value SIRYTHAD from the color difference signal CVI of the original image or adding the stand value SIRYTHAD to the color difference signal CVI of the original image, and then output to the MUX 351.

Position signal generating portion 340 receives the blanking signal SICBLANK and the CZ signal output from the AND gate 335 and outputs the CS1 and CD1SIBLK signals which are used as the position signal of the overlapping image. The selection operation of the MUX 351 is set forth in the following Table 1 in relation to the output signal CS1 of the OR gate 348 and the output signal CD1SIBLK signal of the D flip-flop 341.

TABLE 1

| CS1 | CDISIBLK | OUTPUT OF MUX 351 |
|-----|----------|-------------------|
| L   | L        | A                 |
| L   | H        | B                 |
| H   | L        | C                 |
| H   | H        | D                 |

When the shape color difference signal B output from the shape color difference signal setting portion 320 is larger than the threshold color difference signal D, the MUX 351 prevents the color from becoming unnatural due to the image overlap or the title mix.

FIG. 3B is a timing diagram which illustrates the operation of the apparatus shown in FIG. 3A. The output signal CSIVO of the D flip-flop 352 is determined by MUX 351 under the control of the position signals CS1 and CD1SIBLK. In the CSO and the CSIVO signal waveforms, CDm, SCDn, CBK and CSITH, respectively, denote the original image signal, the shape color signal, the edge color signal, and the threshold color signal of the original image. A section c of the CSIVO signal is the region into which the edge signal is inserted for emphasizing the edge of the overlapping image. A section b is a region into which the color difference signal displayed inside the edge of the overlapping image is inserted.

Figure 4A:
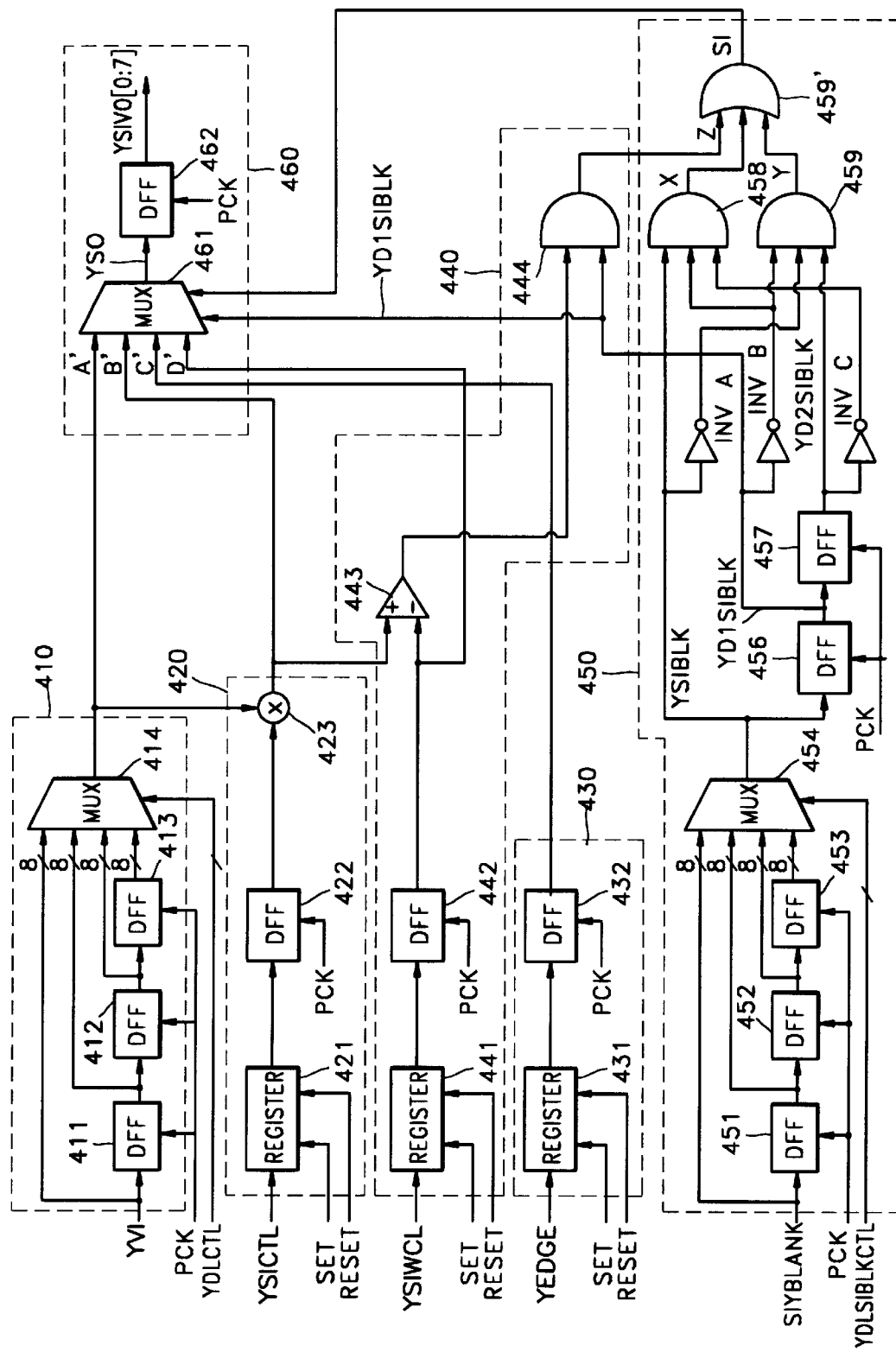
FIG. 4A is a diagram showing an embodiment of the luminance signal superimposing apparatus shown in FIG. 2B.
Figure 4B:
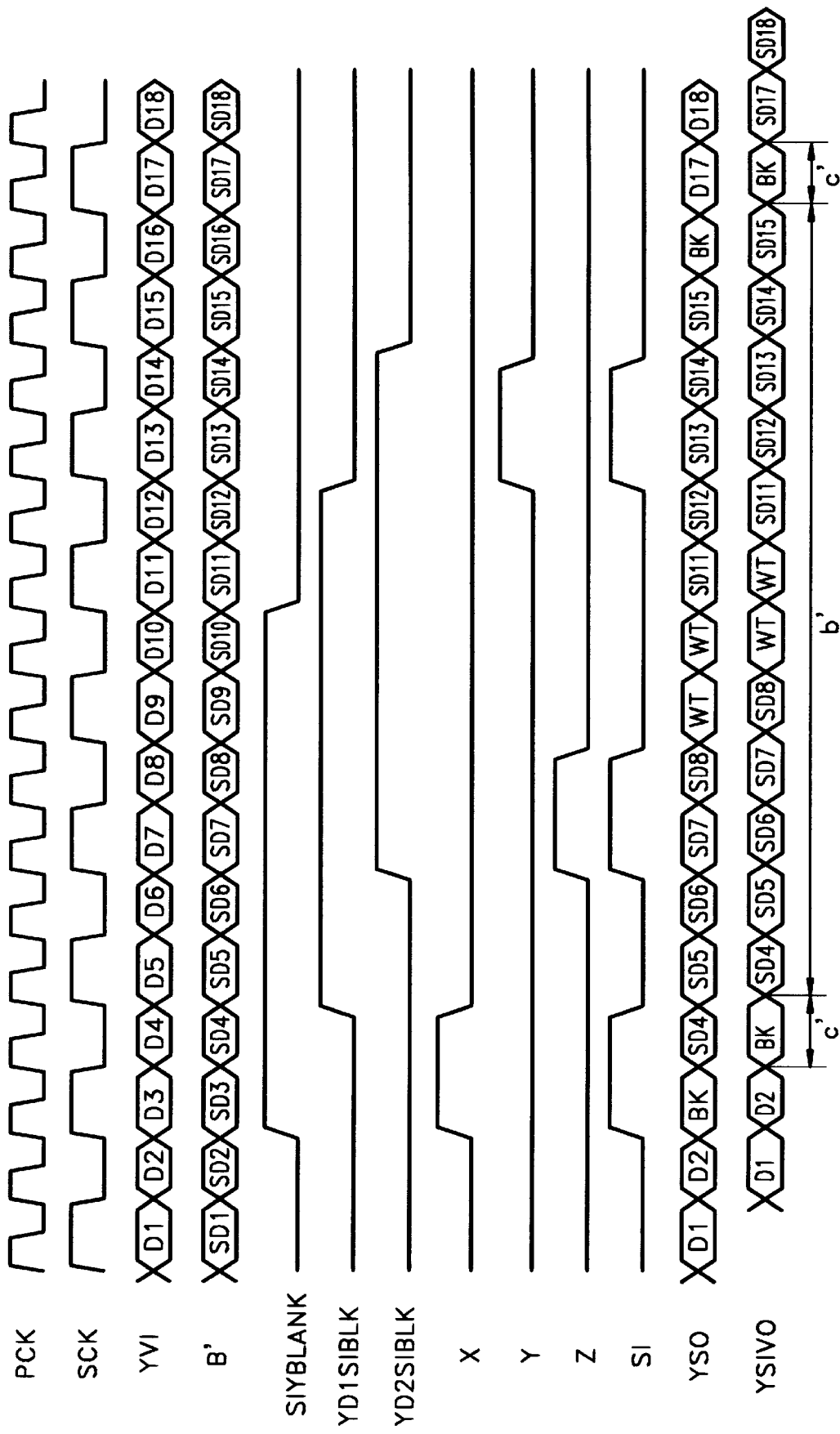
FIG. 4B is a timing diagram for explaining the operation of the apparatus shown in FIG. 4A.

FIG. 4A is a diagram showing an embodiment of the luminance signal superimposing apparatus shown in FIG. 2B. FIG. 4B is a timing diagram which illustrates the operation of the apparatus shown in FIG. 4A.

Referring to FIG. 4A, a luminance signal delay unit 410 includes D flip-flops 411, 412 and 413 for delaying a luminance signal YVI of the original image for a predetermined amount of time and a MUX 414 for outputting either the undelayed luminance signal YVI or one of the delayed luminance signals output from D flip-flops 411, 412 and 413 under the control of YDLCTL signal. Here, the system clock PCK is the clock signal for D flip-flops 411, 412 and 413.

An overlap luminance signal setting portion 420 includes a register 421 which receives the gain coefficient signal YSICTL, a D flip-flop 422, and a multiplier 423 for multiplying the output signal of the D flip-flop 422 and the output signal of the MUX 414. A signal B' is output from the multiplier 423 to a MUX 461.

An edge luminance signal setting portion 430 includes a register of 431, which receives the luminance signal YEDGE of the edge, and D flip-flop 432. A signal C' is output from the D flip-flop 432 to the MUX 461.

A threshold signal setting portion 440 includes a register 441 into which the white clip level signal YSIWCL of the luminance signal is input, a D flip-flop 442, a comparator 443 for comparing the output signal D' of the D flip-flop 442 with the output signal B' of the multiplier 423, and an AND gate 444 for performing a logical AND operation on the output signal of the comparator 443 and a delayed blanking signal YD1SIBLK.

A position signal generating portion 450 includes D flip-flops 451, 452 and 453 for delaying the blanking signal SIYBLANK, a MUX 454 for selecting either the undelayed blanking signal SIYBLANK or one of the output signals of the respective D flip-flops 451, 452 and 453 under the control of the control signal YDLSIBLKCTL, D flip-flops 456 and 457 for delaying the output of the MUX 454, inverters INV A, INV B and INV C, AND gates 458 and 459, and an OR gate 459'. The position signal generating portion 450 receives the blanking signal SIYBLANK and the output signal Z of the AND gate 444 and produces the position signals SI and YD1SIBLK.

A luminance signal selecting portion 460 includes the MUX 461, for selecting one of signals A', B', and D' for output according to the position signals SI and YD1SIBLK, and a D flip-flop 462 for latching the output of the MUX 461 according to the system clock PCK. The MUX 461 outputs the luminance signal YVI of the original image when the blanking signal SIYBLK is 'low' and outputs the luminance signal of the overlapping image when the blanking signal SIYBLANK is 'high'.

Hereinafter, the operation of the apparatus when the blanking signal is 'high' will be described.

The luminance signal of the edge YEDGE is delayed in the register 431 and the D flip-flop 432 and the magnitude of the edge luminance signal C' is determined, after which the edge luminance signal C' is output to the MUX 461. The luminance signal YVI of the original image is multiplied by the gain coefficient signal YSICTL in the multiplier 423 and the resultant value is output to the MUX 461, while the standard value of the luminance signal, i.e. the white clip level signal YSIWCL, is delayed in the register 441 and the D flip-flop 442. The overlap luminance signal B', which is output from the overlap luminance signal setting portion 420, is compared with the output signal D', which is the delayed white clip level signal from the D flip-flop 442, in the comparator 443, after which the AND gate 444 outputs the control signal Z by performing a logical AND operation on the output signal YD1SIBLK of the D flip-flop 456 and the output signal of the comparator 443.

The output signal SI of the OR gate 459' and the output signal YD1SIBLK of the D flip-flop 456 are used as the position control signal of the overlapping image. The operation of the MUX 461 is set forth in the following Table 2 according to the position control signal SI and YD1SIBLK.

TABLE 2

| SI | YDISIBLK | OUTPUT OF MUX 461 |
|----|----------|-------------------|
| L  | L        | A                 |
| L  | H        | B                 |
| H  | L        | C                 |
| H  | H        | D                 |

When the overlap luminance signal B' which is output from the overlap luminance signal setting portion 420 is larger than the white clip level signal D', the MUX 461 prevents the shading of lightness and darkness from becoming unnatural due to the image overlap or title mix.

FIG. 4B is a timing diagram which illustrates the operation of the apparatus shown in FIG. 4A, wherein the output signal YSIVO of the D flip-flop 462 is the signal selected and output by the MUX 461 under the control of the position signals SI and YD1SIBLK output from the position signal generating portion 450. In the YSIVO signal, SDm, WT, YBK, and Dn are, respectively, an overlap luminance signal, a white clip level signal, an edge luminance signal, and a luminance signal of the original image. The c' and b' sections of the YSIVO signal are, respectively, the region into which the edge luminance signal is inserted for emphasizing the edge of the overlapping image and the region into which the luminance signal is inserted which is displayed inside the edge of the overlapping image.

As mentioned above, in the superimposing apparatus according to the present invention, it is possible to maintain the shape of the original image in a position in the screen image that is overlapped by the new image or the title mix by changing the color and luminance of the edge and the inner portion of the overlapping image or the mixing title based upon the color and luminance of the original image data and displaying them on screen.

What is claimed is:

1. A color difference signal superimposing apparatus for displaying an original image signal overlapped with another image signal, the apparatus comprising:

edge color difference signal setting means for setting an edge color difference signal to be displayed as the edge of the overlapping image according to information regarding the magnitude and phase of a color difference signal of the edge of the overlapping image;

shape color difference signal setting means for changing the magnitude of the color difference signal of the original image according to a gain coefficient for setting the magnitude of the color difference signal to be expressed in the edge of the overlapping image and setting the shape color difference signal to be expressed in the edge of the overlapping image;

position signal generating means for generating a position signal which determines the position in which the color difference signal is to be displayed on a screen according to the information regarding the shape and the position of the overlapping image; and color difference signal selecting means for selecting and outputting one from among the color difference signal of the original image, the shape color difference signal, and the edge color difference signal according to the position signal;

wherein said color difference signal superimposing apparatus outputs the shape color difference signal to the inside position of the edge of the overlapping image, the edge color difference signal to the position of the edge of the overlapping image, and the color difference signal of the original image to the position in which the original image is to be displayed.

2. A superimposing apparatus as claimed in claim 1, further comprising:

means for generating a threshold color difference signal by adding a predetermined value to the color difference signal of the original image or by subtracting a predetermined value from the color difference signal of the original image according to the information regarding a predetermined threshold value; and position information generating means for generating the information regarding the position of the overlapping image when the magnitude of the shape color difference signal is larger than that of the threshold color difference signal by comparing the magnitude of the threshold color difference signal with that of the shape color difference signal, wherein said color difference signal selecting means outputs the threshold color difference signal in the position set by the position information when the magnitude of the shape color difference signal is larger than that of the threshold color difference signal.

3. A luminance signal superimposing apparatus for displaying an original image signal overlapped with another image signal, the apparatus comprising:

edge luminance signal setting means for setting an edge luminance signal to be displayed as the edge of the overlapping image according to the information regarding the magnitude of a luminance signal of the edge of the overlapping image;

overlap luminance signal setting means for changing the magnitude of the luminance signal of the original image according to a gain coefficient for setting the magnitude of the luminance signal expressing the overlapping image and setting an overlap luminance signal to be expressed in the edge of the overlapping image;

position signal generating means for generating a position signal which determines the position in which the luminance signal is to be displayed on a screen according to the information concerning the shape and the position of the overlapping image; and luminance signal selecting means for selecting and outputting one from among the luminance signal of the original image, the overlap luminance signal, and the edge luminance signal according to the position signal;

wherein said luminance signal superimposing apparatus outputs the overlap luminance signal to the inside position of the edge of the overlapping image, the edge luminance signal to the position of the edge of the overlapping image, and the luminance signal of the original image to the position in which the original image is to be displayed.

4. A superimposing apparatus as claimed in claim 3, further comprising:

means for generating a threshold luminance signal by adding a predetermined value to the luminance signal of the original image or by subtracting a predetermined value from the luminance signal of the original image according to the information regarding a predetermined threshold value; and position information generating means for generating the information regarding the position of the overlapping image when the magnitude of the overlap luminance signal is larger than that of the threshold luminance signal by comparing the magnitude of the threshold luminance signal with that of the overlap luminance signal, wherein said luminance signal selecting means outputs the threshold luminance signal in the position set by said position information when the magnitude of the overlap luminance signal is larger than that of the threshold luminance signal.

5. A superimposing apparatus for displaying an overlapping image signal on an original image signal while preserving the original image, the apparatus comprising:

edge color difference signal setting means for setting an edge color difference signal to be displayed as the edge of the overlapping image according to the information regarding the magnitude and phase of the color difference signal of the edge of the overlapping image;

shape color difference signal setting means for changing the magnitude of the color difference signal of the original image according to the gain coefficient for setting the magnitude of the color difference signal to be expressed in the edge of the overlapping image;

means for generating a color difference position signal which determines the position of the color difference signal to be displayed on a screen according to the information regarding the shape and position of the overlapping image;

color difference signal selecting means for selecting and outputting one from among the color difference signal of the original image, the shape color difference signal, and the edge color difference signal according to the color difference position signal;

edge luminance signal setting means for setting the edge luminance signal to be displayed as the edge of the overlapping image according to the information regarding the magnitude of the luminance signal of the edge of the overlapping image;

overlap luminance signal setting means for changing the magnitude of the luminance signal of the original image according to the gain coefficient for setting the magnitude of the luminance signal expressing the overlapping image and setting an overlap luminance signal to be expressed in the edge of the overlapping image;

means for generating a luminance position signal for determining the position in which the luminance signal is to be displayed on the screen according to the information regarding the shape and position of the overlapping image; and luminance signal selecting means for selecting and outputting one from among the luminance signal of the original image, the overlap luminance signal and the edge luminance signal according to the luminance position signal;

wherein said superimposing apparatus outputs the shape color difference signal and the overlap luminance signal to the inside position of the overlapping image, the edge color difference signal and the edge luminance signal to the position of the edge of the overlapping image, and the color difference signal and the luminance signal of the original image to the position in which the original image is to be displayed.

6. A superimposing apparatus as claimed in claim 5, further comprising:

means for generating a threshold color difference signal by adding a predetermined value to the color difference signal of the original image or by subtracting a predetermined value from the color difference signal of the original image according to the information regarding a predetermined threshold value; and position information generating means for generating the information regarding the position of the overlapping image when the magnitude of the shape color difference signal is larger than that of the threshold color difference signal by comparing the magnitude of the threshold color difference signal with that of the shape color different signal;

wherein said color difference signal selecting means outputs the threshold color difference signal in the position set by the position information when the magnitude of the shape color difference signal is larger than that of the threshold color difference signal.

7. A superimposing apparatus as claimed in claim 5, further comprising:

means for generating a threshold luminance signal by adding a predetermined value to the luminance signal of the original image or by subtracting a predetermined value from the luminance signal of the original image according to the information regarding a predetermined threshold value; and position information generating means for generating the information regarding the position of the overlapping image when the magnitude of the overlap luminance signal is larger than that of the threshold luminance signal by comparing the magnitude of the threshold luminance signal with that of the overlap luminance signal, wherein said luminance signal selecting means outputs the threshold luminance signal in the position set by said position information when the magnitude of the overlap luminance signal is larger than that of the threshold luminance signal.

8. A method for generating a color difference signal for an overlapping image while preserving an original image, the method comprising the steps:

generating a color difference signal for a shape of the overlapping image responsive to a color difference signal of the original image and a signal which includes a gain coefficient for a magnitude of a color difference to be expressed in an edge of the overlapping image;

generating a color difference signal for the edge of the overlapping image responsive to a signal which includes a magnitude and phase of the color difference of the edge of the overlapping image;

selecting one of the color difference signal of the original image, the color difference signal for the shape of the overlapping image, and the color difference signal for the edge of the overlapping image responsive to a signal which includes the shape and position of the overlapping image, wherein the color difference signal for the shape of the overlapping image is selected to coincide with positions inside of the position of the edge of the overlapping image, the color difference signal for the edge of the overlapping image is selected to coincide with the position of the edge of the overlapping image and the color difference signal of the original image is selected for display at positions that do not coincide with the position of the edge of the overlapping image and the positions inside the edge of the overlapping image.

9. The method for generating a color difference signal for an overlapping image while preserving an original image of claim 8, further including the steps of:

generating a threshold color difference signal responsive to a predetermined threshold value and the color difference signal of the original image; and wherein the step of selecting one of the color difference signal of the original image, the threshold color difference signal, the color difference signal for the shape of the overlapping image, and the color difference signal for the edge of the overlapping image responsive to a signal which includes the shape and position of the overlapping image, further includes:

selecting the threshold color difference signal in place of the color difference signal for the shape of the overlapping image when the color difference signal for the shape of the overlapping image is greater than the threshold color difference signal.

10. A method for generating a luminance signal for an overlapping image while preserving an original image, the method comprising the steps:

generating a delayed luminance signal for the original image by delaying a luminance signal of the original image by a predetermined amount of delay required to synchronize the luminance signal of the original image and a color difference signal of the original image;

generating a luminance signal for the overlapping image responsive to the delayed luminance signal for the original image and a signal which includes a gain coefficient for setting a magnitude of the luminance signal for the overlapping image, wherein a magnitude of the delayed luminance signal is changed according to the gain coefficient;

generating a luminance signal for an edge of the overlapping image responsive to a signal which includes a magnitude of the luminance signal for an edge of the overlapping image;

selecting one of the delayed luminance signal for the original image, the luminance signal for the overlapping image and the luminance signal for the edge of the overlapping image responsive to a signal which includes a shape and position of the overlapping image, wherein the luminance signal for the edge of the overlapping image is selected to coincide with a position of the edge of the overlapping image, the luminance signal for the overlapping image is selected to coincide with positions inside the position of the edge of the overlapping image, and the delayed luminance signal of the original image is selected to coincide with positions that do not coincide with the position of the edge of the overlapping image and the positions inside the position of the edge of the overlapping image.

11. The method for generating a luminance signal for an overlapping image while preserving an original image of claim 10, further including the steps of:

generating a threshold luminance signal responsive to a predetermined threshold value and the delayed luminance signal of the original image; and wherein the step of selecting one of the delayed luminance signal for the original image, the luminance signal for the overlapping image and the luminance signal for the edge of the overlapping image responsive to a signal which includes a shape and position of the overlapping image further includes:

selecting the threshold luminance signal in place of the luminance signal for the shape of the overlapping image when the luminance signal for the shape of the overlapping image is greater than the threshold luminance signal.

* * * * *